United States Patent [19]
Ueda et al.

[11] Patent Number: 5,222,687
[45] Date of Patent: Jun. 29, 1993

[54] REEL DRIVE APPARATUS

[75] Inventors: Yoshifumi Ueda, Kanagawa; Susumu Hisadomi, Saitama, both of Japan

[73] Assignee: Kabushiki Kaisha Toshiba, Kanagawa, Japan

[21] Appl. No.: 634,714

[22] Filed: Dec. 27, 1990

[30] Foreign Application Priority Data

Dec. 28, 1989 [JP] Japan .................. 1-339731

[51] Int. Cl.[5] .................. G11B 15/60; G11B 23/04
[52] U.S. Cl. .................. 242/201; 242/200
[58] Field of Search .................. 242/200–201

[56] References Cited

U.S. PATENT DOCUMENTS

| | | | |
|---|---|---|---|
| 4,139,169 | 2/1979 | Kono | 242/201 |
| 4,196,874 | 4/1980 | Ohara | 242/201 |
| 4,252,284 | 2/1981 | Suzuki | 242/201 |
| 4,260,120 | 4/1981 | Urata et al. | 242/201 |
| 4,422,114 | 12/1983 | Sugimara | 242/208 X |
| 4,532,563 | 7/1985 | Edakudo | 242/200 X |
| 4,698,706 | 10/1987 | Kilstofte | 242/200 X |
| 4,711,410 | 12/1987 | Gwon | 242/200 X |
| 4,723,184 | 2/1988 | Takai et al. | 242/200 X |
| 5,003,418 | 3/1991 | Yang | 242/200 X |
| 5,005,094 | 4/1991 | Komatsu et al. | 242/200 X |

FOREIGN PATENT DOCUMENTS

0193243A3 2/1985 European Pat. Off. .
0376280A1 12/1989 European Pat. Off. .
WO90/12397 10/1990 PCT Int'l Appl. .

*Primary Examiner*—Daniel P. Stodola
*Assistant Examiner*—William Stryjewski
*Attorney, Agent, or Firm*—Finnegan, Henderson, Farabow, Garrett & Dunner

[57] ABSTRACT

A reel drive apparatus for selectively driving a pair of the reel turntables. The apparatus includes a shaft, a pulley rotatably mounted on the shaft, a sun gear fixed coaxially to the pulley, a planet gear engaged with the sun gear, a planet gear holder rotatably supported on the shaft for supporting the planet gear, an internal gear rotatably mounted on the shaft and engaged with the planet gear, an outer gear fixed coaxially to the internal gear, an idler arm rockably mounted its one end on the shaft, an idler gear mounted to another end of the idler arm and engaged with the outer gear and a clutch for selectively transmitting a driving force to the planet gear holder.

1 Claim, 2 Drawing Sheets

REEL DRIVE APPARATUS

FIELD OF THE INVENTION

The present invention relates generally to a reel drive apparatus, and more particularly, to a reel drive apparatus for magnetic tape recorders.

BACKGROUND OF THE INVENTION

Conventionally, magnetic tape recorders such as video tape recorders are designed to drive a tape in the forward and reverse directions by using exclusively a supply reel driving turntable and a take-up reel driving turntable, respectively.

A tape running direction is selected by selectively engaging an idler gear to either the supply reel driving turntable or the take-up reel driving turntable. The idler gear is supported on an idler arm which is rockably coupled to a capstan drive mechanism. The capstan drive mechanism has a capstan motor for rotating a capstan in one direction or the other direction. Thus, the idler arm is rocked toward the supply reel driving turntable or the take-up reel driving turntable, in response to a rotating direction of the capstan motor.

When an operation mode of the video tape recorder changes from a forward reproducing operation to a reverse reproducing operation or vice versa, a tape is typically held by the capstan and a pinch roller for pressing the tape to the capstan. Thus, the tape is driven in the reverse direction simultaneously to the change of the operation mode between the forward reproducing operation and the reverse reproducing operation.

On the other hand, the take-up reel driving turntable or the FRD turntable is driven with a delay of time from the mode change because the idler gear takes time during its swing from the take-up reel driving turntable to the supply reel driving turntable.

Thus, the video tape recorder fails to drive the tape immediately at the mode change. As a result, a loose tape tension occurs on the tape for the delay time, causing troubles on reproduced signals such as reproduced images and sounds.

In order to solve the troubles, in the conventional video tape recorder an additional motor for exclusively driving the reel driving turntables are provided for maintaining a desired tape tension at the mode change. Therefore, such a conventional video tape recorder has a problem of cost due to the additional motor.

SUMMARY OF THE INVENTION

It is, therefore, an object of the present invention to provide a reel drive apparatus which is able to maintain a desired tape tension at a mode change with a simple construction.

Another object of the present invention is to provide a reel drive apparatus which accomplishes a secure operation for a mode change between a forward reproducing operation and a reverse reproducing operation.

In order to achieve the above object, a reel drive apparatus according to one aspect of the present invention includes a shaft, a pulley rotatably mounted on the shaft, a sun gear fixed coaxially to the pulley, a planet gear engaged with the sun gear, a planet gear holder rotatably supported on the shaft for supporting the planet gear, an internal gear rotatably mounted on the shaft and engaged with the planet gear, an outer gear fixed coaxially to the internal gear, an idler arm rockably mounted its one end on the shaft, an idler gear mounted to another end of the idler arm and engaged with the outer gear and a clutch for selectively transmitting a driving force to the planet gear holder.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWING

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
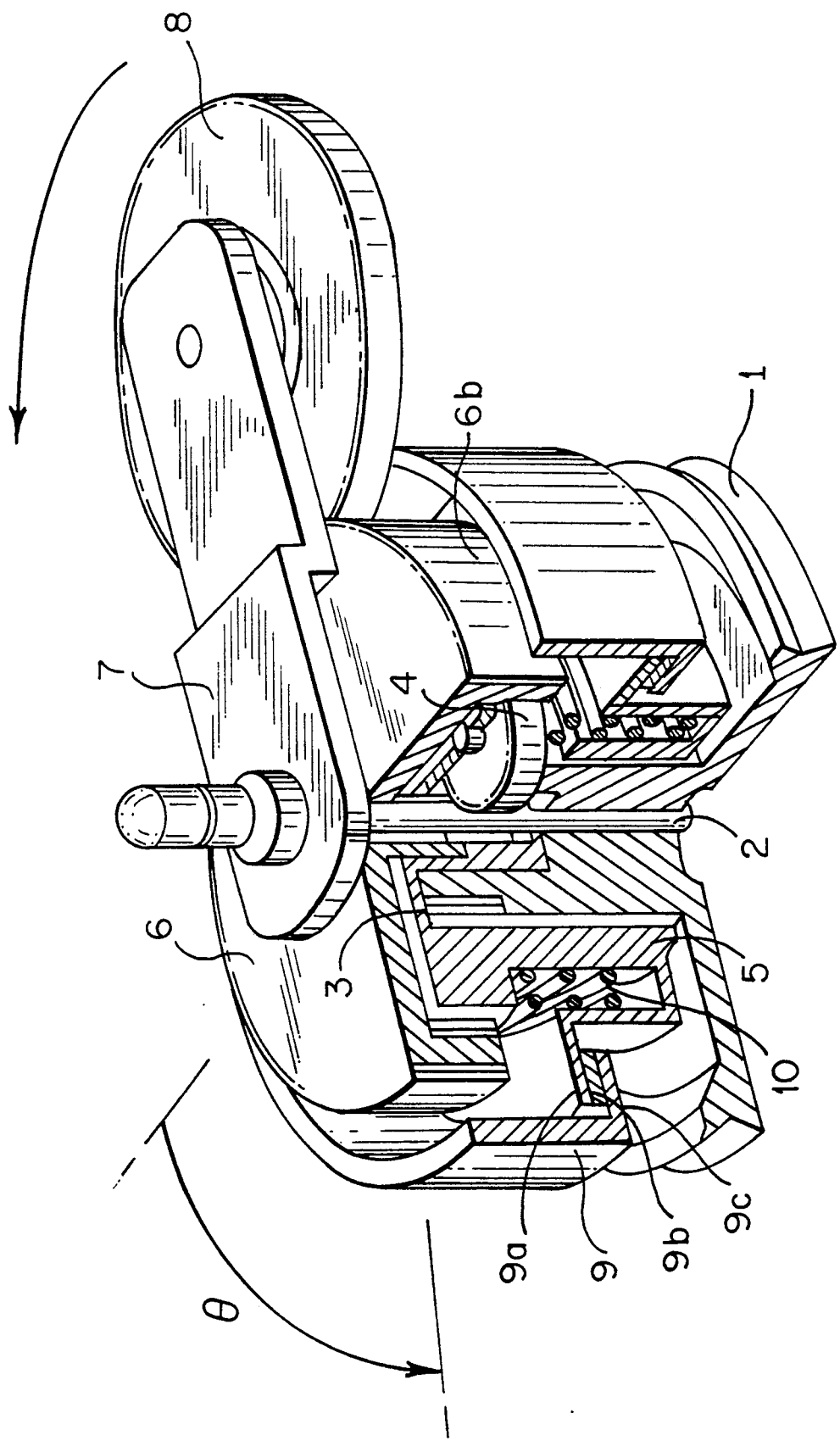
FIG. 1 is a partially fragmental perspective view of the reel drive apparatus of an embodiment according to the present invention.

The present invention will be described in detail with reference to the attached drawings FIGS. 1 and 2. FIG. 1 shows a partially fragmental perspective view of the reel drive apparatus of an embodiment according to the present invention, while FIG. 2 shows a cross section of the reel drive apparatus installed in its environment.

Figure 2:
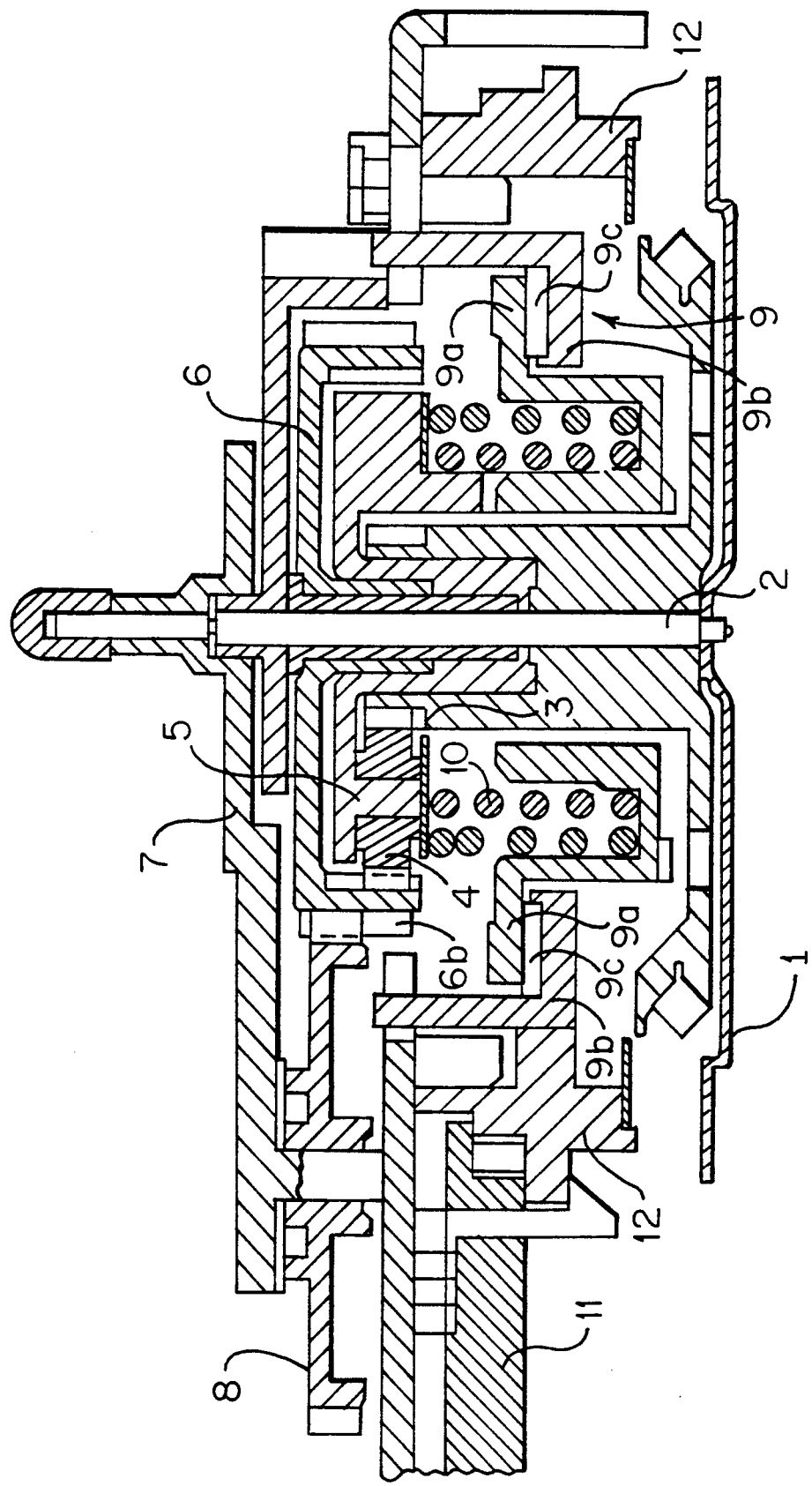
FIG. 2 is a cross section showing the reel drive apparatus of FIG. 1.

As shown in FIGS. 1 and 2, a pulley 1 is rotatably mounted about a center shaft 2. The pulley 1 is driven by a conventional capstan motor (not shown) through a transmission belt (not shown). A sun gear 3 is mounted coaxially with the pulley 1 and fixed on the pulley 1. Thus, the sun gear 3 is rotated together with the pulley 1 by the capstan motor.

A planet gear 4 is provided so that the planet gear 4 can orbit around the sun gear 3, as well as rotate on its own axis. The planet gear 4 engages with the sun gear 3.

Further, a center gear 6 is coaxially mounted on the center shaft 2. The center gear 6 has an internal gear 6a and an outer gear 6b which are coaxially fixed together. The internal gear 6a engages with the the planet gear 4. Thus, the center gear 6 rotates when the planet gear 4 rotates on its axis.

An idler ar 7 is rockably mounted to the center shaft 2 at its one end. The idler arm 7 supports an idler gear 8 on it other ed. The idler gear 8 engages with the outer gear 6b of the center gear 6. Thus, the idler gear 8 can orbit around the outer gear 6b of the center gear 6, as well as rotate on its own axis.

The planet gear holder 5 has a clutch 9. The clutch 9 has a first clutch member 9a, a second clutch member 9b and a friction member 9c. The first clutch member 9a is engaged with the planet gear holder 5 so that the first clutch member 9a rotates together with the planet gear holder 5 but can move along the axis of the planet gear holder 5. The second clutch member 9b faces to the first clutch member 9a, and supports the friction member 9c. The second clutch member 9b has a ring shape and is rotatable around the center shaft 2 in both the forward and reverse directions independently of the rotation of the pulley 1. The friction member 9c has also a ring shape and faces to the first clutch member 9a.

Further, a coil spring 10 is provided between the planet gear holder 5 and the first clutch member 9a.

Thus, the planet gear holder 5 is selectably driven by an outer member 11 through the clutch 9 which is supported by the clutch support ring 12.

In the reproduction mode, the second clutch member 9b is compressed against the first clutch member 9a via the friction member 9c by the force of this coil spring 10.

In the vicinity of the idler gear 8, a supply reel driving turntable (not shown) and a take-up reel driving turntable (not shown) are provided. Thus the idler gear 8 selectively engages with either &he supply reel driving turntable or the take-up reel driving turntable.

Now a mode changing operation of the video tape recorder between the forward reproduction mode and the reverse reproduction mode according to the reel drive apparatus will be explained.

First, when the operation mode of the video tape recorder is changed from the forward reproduction mode to the reverse reproduction mode, the capstan motor (not shown) is stopped. Thereafter, the second clutch member 9b is rotated for a prescribed angle θ by the outer member 11 in the counterclockwise direction as shown by the arrow in FIG. 1.

The clutch 9 transmits the rotating force of the second clutch member 9b to the planet gear holder 5, because the first clutch member 9a is coupled to the second clutch member 9b via the friction member 9c.

At the initiation of the reverse reproduction mode, the pulley 1 is in the stopped state, while the sun gear 3 is in the stationary s&ate. Therefore, the center gear 6 rotates in the direction of the arrow by an angle which is given in a following equation.

$$\theta = (Z1/Z2 + 1) \cdot \theta$$

wherein;

Z1: the number of teeth of the sun gear 3,
Z2: the number of teeth of the internal gear 6a of the center gear 6.

The idler gear 8 rotates in the direction of the arrow when the center gear 6 rotates and the idler arm 7 is rocked in the direction of the arrow. As a result, the idler gear 8 engages with the other reel turntable. i.e., the take-up reel driving turntable. Thereafter, the pulley 1 is driven in the clockwise direction by reversing the capstan motor. Thus, a tape is driven by the take-up reel driving turntable and the reverse reproduction mode starts.

According to the embodiment, the reel drive apparatus moves the idler gear 8 between the take-up reel driving turntable and the supply reel driving turntable under the state where the pulley 1 is kept stopped. That is, the mode change between the forward reproduction mode and the reverse reproduction mode is carried out independently from a driving system according to the capstan motor. As a result, the reel drive apparatus according to the present invention can change the operation mode between the forward reproduction mode and the reverse reproduction mode when the capstan motor is stopped.

As described above, the reel drive apparatus of the present invention prevents a loose tape tension of the tape so that it is able to carry out a satisfactory tape reproduction at the mode change.

As described above, the present invention can provide an extremely preferable reel drive apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated fdr carrying out the present invention, but that the present invention include all embodiments falling within the scope of the appended claims.

What is claimed is:

1. A reel drive apparatus, comprising:
   a shaft;
   a pulley rotatably mounted on the shaft;
   a sun gear fixed coaxially to the pulley;
   a planet gear engaged with the sun gear;
   a planet gear holder rotatably supported on the shaft for supporting the planet gear;
   an internal gear rotatably mounted on the shaft and engaged with the planet gear;
   an outer gear fixed coaxially to the internal gear;
   an idler arm rockably having one end mounted on the shaft;
   an idler gear, mounted to another end of the idler arm and engaged with the outer gear, which drives a reel; and
   a clutch positioned radially outside of the adapted to transmit a driving force to the planet gear holder.

* * * * *

UNITED STATES PATENT AND TRADEMARK OFFICE
CERTIFICATE OF CORRECTION

PATENT NO. : 5,222,687
DATED : June 29, 1993
INVENTOR(S) : Yoshifumi Ueda et al.

It is certified that error appears in the above-indentified patent and that said Letters Patent is hereby corrected as shown below:

Abstract, Front Page, line 9, before "its one end" insert --at--.

Claim 1, column 4, line 49, change "the" to --and--.

Signed and Sealed this

Twenty-fifth Day of October, 1994

Attest:

*Attesting Officer*

BRUCE LEHMAN

*Commissioner of Patents and Trademarks*